United States Patent [19]

Heighberger

[11] 3,938,571

[45] Feb. 17, 1976

[54] NUT WITH SEALING INSERT

[76] Inventor: Robert N. Heighberger, c/o Jos. Dyson & Sons, Inc., 33300 Lakeland Blvd., Eastlake, Ohio 44094

[22] Filed: July 15, 1974

[21] Appl. No.: 488,269

[52] U.S. Cl. .................................................. 151/7
[51] Int. Cl.² .......................................... F16B 39/34
[58] Field of Search .......... 151/7; 85/1 JP; 285/220; 277/189, 166, 112, 115

[56] References Cited
UNITED STATES PATENTS

| | | |
|---|---|---|
| 2,872,961 | 2/1959 | Mills et al. .............................. 151/7 |
| 3,203,459 | 8/1965 | Coldren ................................... 151/7 |
| 3,241,422 | 3/1966 | Heimovics ........................... 151/7 X |
| 3,316,952 | 5/1967 | Hollinger ................................ 151/7 |

*Primary Examiner* — Ramon S. Britts

[57] ABSTRACT

There is disclosed a nut construction embodying an insert which provides for sealing and locking by damping vibration, the action of sealing being translated to locking by the formation of the insert.

1 Claim, 6 Drawing Figures

NUT WITH SEALING INSERT

OBJECTS OF THE INVENTION

It is a principal object of this invention to provide an insert for use in the cavity of a nut, which insert is formed peculiarly and of a particular material so that as the sealing action takes place, the locking action will likewise be entered into, the locking action depending upon vibration damping to be particularly effective, the material of which the insert is made being most responsive to forces transmitted during the sealing action for the purposes hereof.

A further object of the invention is to provide an insert of the material which has substantial lubricity, and a particularly excellent elastic memory, such that as the sealing action takes place, simultaneous movement of portions of the insert will be the result, causing the insert to have certain areas move into engagement with threads of a member upon which the nut of the invention is mounted, and thereby in effect virtually reduce to nothing the translation of vibratory forces to the nut which would tend to unlock the same in many circumstances.

Another object of the invention is to provide an insert which has a sealing collar, spaced from a conical portion, the conical portion in turn being adapted to enter into engagement with the threads of a male device upon which the nut is mounted, the insert being in turn mounted in the cavity of the nut, such that longitudinal movement of portions of the insert is translated into inward movement likewise by the formation of the cavity and by the elastic nature of the insert caused to engage and in effect insulate the threads from translating the vibratory forces thereof to the nut such that unlocking action would result.

Other and further objects of the invention will be understood from a consideration of the specification appended hereto and disclosed in the drawing wherein.

DESCRIPTION OF THE INVENTION

Figure 1:
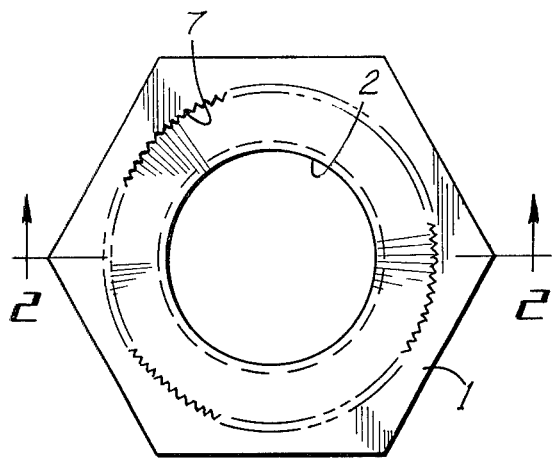
FIG. 1 is a plan view of a nut prior to insertion of the insert thereinto a cavity provided.
Figure 2:
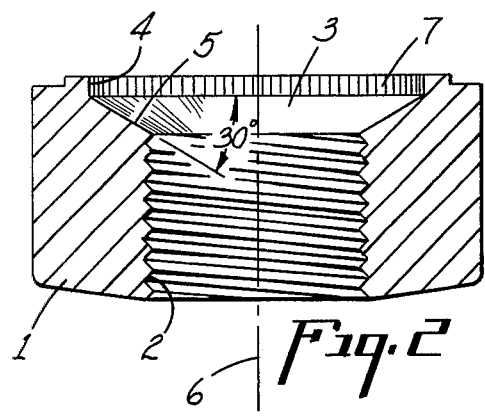
FIG. 2 is a vertical sectional view, taken about on the line 2—2 of FIG. 1, looking in the direction of the arrows to show the configuration of the nut.

Referring to FIG. 1, the disclosure herein is embodied in a nut body 1, being of hex form in somewhat conventional practice, having the usual threads 2 therein, suggested in FIG. 2, with a cavity generally denoted 3 at the upper end, this cavity including a cylindrical section 4 and a conical portion 5, extending inwardly toward the axis of the body from the inner end of the section 4, the axis being denoted 6.

The section 4 is provided with knurled portions 7 therearound of substantial depth and sharpness.

The cavity conical portion 5 is arranged so that the conical plane is at an angle of 30° with respect to a plane perpendicular to the axis 6 as suggested in FIG. 2.

Figure 3:
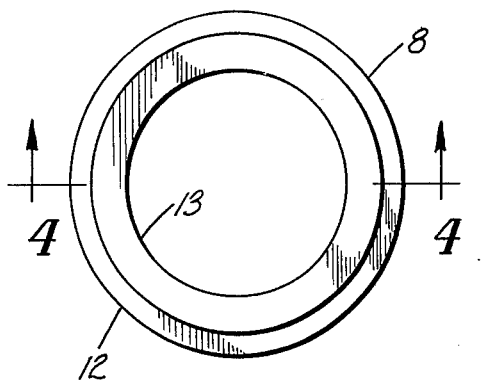
FIG. 3 is a top plan view of the sealing and locking insert of the invention.
Figure 4:
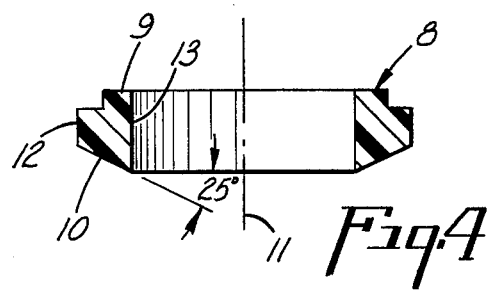
FIG. 4 is a sectional view, taken about on the line 4—4 of FIG. 3, looking in the direction of the arrows.

Referring now to FIGS. 3 and 4, the insert which provides the vibration damping and sealing action is disclosed as including a ring-like member 8 at the upper end of which is a sealing collar 9 arranged so as to extend upwardly from the ring-like member 8, the collar 9 being of roughly or approximately one-half the thickness of the seal 8 and extending upwardly sufficiently so as to be clearly discernable.

At the lower end of the seal 8 is a conical portion 10, which conical portion is arranged so that the plane thereof lies at about 25 degrees with respect to a plane at right angles to the axis of the seal, the axis being denoted 11.

The seal 8 is intended to be emplaced in the nut body 1 so that the periphery 12 thereof, the same being cylindrical, will in turn engage with the knurled area 7 of the nut body and thus be rotatively fixed with respect thereto.

Figure 5:
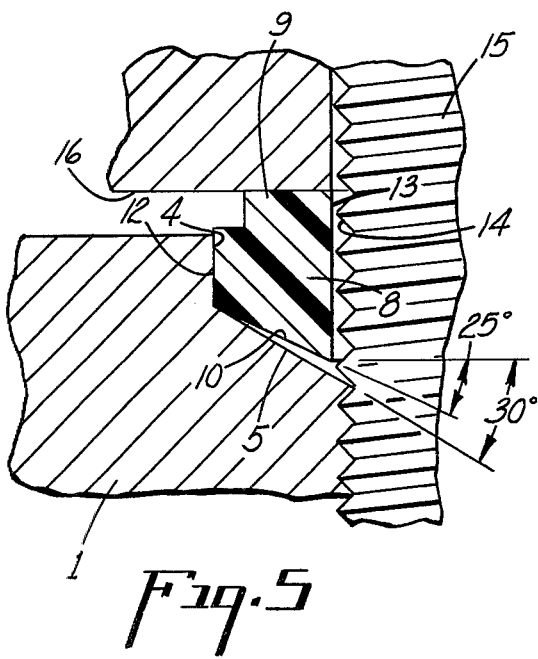
FIG. 5 is an enlarged fragmentary view of the nut, a male threaded device upon which the nut is mounted, the member from which the male threaded device extends and with which sealing action is desired, with the insert in the position just prior to initial tightening action.

It should be noted as is more clearly shown in enlarged form in FIG. 5 that the inner periphery of the seal 8, designated 13, likewise cylindrical, is normally spaced substantially from the tips of the threads 14 which are in turn a part of a male threaded device 15. Thus, when the nut body 8 is rotated with the seal, and lock member 8 in place, no rotative restraint will be imparted to the nut body by engagement of the seal with the threads 14.

Figure 6:
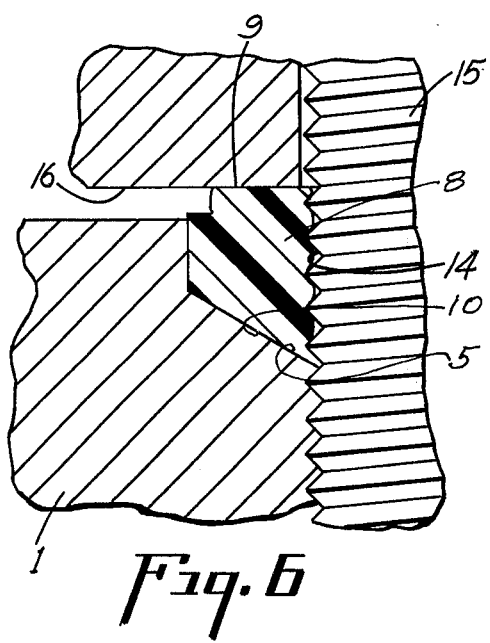
FIG. 6 is a view similar to FIG. 5, but with tightening action having been effected on the part of the nut, with the fragmentary areas showing in enlarged and somewhat exaggerated detail, the action of the seal in its sealing and locking movement as partly accomplished.

However, when the sealing collar 9 engages with the surface 16 from which the male threaded device 15 extends, there will be imparted to the seal and locking member 8 an axial longitudinal force which will in turn cause the lower end of the seal as shown, and the lower end of the seal and locking device to move into engagement with the threads 14 as suggested in FIG. 6.

This is a result of the distortion and pressure exerted on the seal at the upper end as suggested in FIG. 6, whereby tightening action imparted to the nut body will in turn cause the seal and locking member 8 to engage with a number of threads in such a manner as to adequately dampen the translation of vibration thereto, which vibration would normally act to in turn cause the nut body to rotate into an unloosened condition.

Thus, in effect, there is provided a damping by the seal and locking member 8 as well as a sealing action against the surface 16, this being a combination result of the formation of the insert itself.

FIG. 6 is a somewhat intermediate position, it being appreciated that further tightening action on the part of the nut body 1 will in turn cause a further movement of the material from which the seal is made and increased damping action on the part of the seal and insert 8.

It will be understood that the sealing collar 9, by reason of its configuration and relatively smaller area than that of the insert generally speaking as viewed from the top, will cause the lower end of the insert 8 to move as suggested more quickly than would otherwise be the case.

Thus, the sealing and damping or locking action will be enhanced and since the material from which the insert is made being particularly chosen because of its elastic memory, and lubricity, will return to a position substantially as shown in FIG. 5, when the nut is loosened upon the intent of the user so to do.

For this purpose, the material from which the insert is made is polytetrafluorethylene, this having the particular excellent quality of elastic memory, and having been found to be particularly good in providing the damping reaction necessary to effect desired locking action of the nut body in carrying out its function.

I claim:

1. In sealing and locking means of the class described, in combination, a nut body having threads internally thereof, a male threaded device engaging the internal threads, an insert cavity in one end of said body, said cavity including a cylindrical section and a conical portion extending inwardly toward the axis of the body from the inner end of the section at a first angle, said section being knurled, and an insert of material having an excellent elastic memory and lubricity in said cavity with a conical portion at one end lying at a lesser angle than that of the cavity conical portion mentioned for the entire peripheral extent thereof, the planes of said portion and section intersecting at the inner end of the section aforesaid, the conical section of the insert comprising the locking element thereof, said insert having a central opening defining a cylindrical inner surface, the diameter of said inner surface being slightly greater than that of the root diameter of the internal threads, said insert extending from the cavity, a sealing collar integral with the insert extending oppositely from the conical portion, said collar being cylindrical with the inner surface thereof being axially aligned with said inner surface of said insert and of a wall thickness of the order of magnitude of one-half the wall thickness of the insert, and of substantially less longitudinal extent than the body of said insert, the end surface of said collar and a surface on said male threaded device having engaging complimentary flat surfaces, each normal to the axis of the body.

* * * * *